United States Patent
Hou et al.

(10) Patent No.: US 12,460,058 B1
(45) Date of Patent: Nov. 4, 2025

(54) HIGH-TRANSPARENCY, LOW TEMPERATURE PROCESSABLE CELLULOSE ACETATE FILM AND METHOD FOR PREPARING THE SAME

(71) Applicant: SHANGHAI UNIVERSITY OF ENGINEERING SCIENCE, Shanghai (CN)

(72) Inventors: Huimin Hou, Shanghai (CN); Chunping Yuan, Shanghai (CN); Song Wang, Shanghai (CN); Jihu Wang, Shanghai (CN); Yamei Miao, Shanghai (CN); Hongmei Zhang, Shanghai (CN); Cuicui Guo, Shanghai (CN)

(73) Assignee: SHANGHAI UNIVERSITY OF ENGINEERING SCIENCE, Shanghai (CN)

( * ) Notice: Subject to any disclaimer, the term of this patent is extended or adjusted under 35 U.S.C. 154(b) by 0 days.

(21) Appl. No.: 19/169,052

(22) Filed: Apr. 3, 2025

Related U.S. Application Data

(63) Continuation of application No. PCT/CN2023/102476, filed on Jun. 26, 2023.

(51) Int. Cl.
| | |
|---|---|
| *C08J 5/18* | (2006.01) |
| *C08K 3/26* | (2006.01) |
| *C08K 3/34* | (2006.01) |
| *C08K 5/23* | (2006.01) |

(52) U.S. Cl.
CPC .................. *C08J 5/18* (2013.01); *C08K 3/26* (2013.01); *C08K 3/346* (2013.01); *C08K 5/235* (2013.01); *C08J 2301/12* (2013.01); *C08J 2467/00* (2013.01); *C08K 2003/265* (2013.01)

(58) Field of Classification Search
None
See application file for complete search history.

(56) References Cited

U.S. PATENT DOCUMENTS

2018/0310624 A1    11/2018    Parker et al.

FOREIGN PATENT DOCUMENTS

| | | | |
|---|---|---|---|
| CN | 107235854 | A | 10/2017 |
| CN | 109503892 | A | 3/2019 |
| CN | 110066424 | A | 7/2019 |
| CN | 111138721 | A | 5/2020 |
| CN | 102050964 | A | 5/2021 |
| CN | 112795037 | A | 5/2021 |
| CN | 113788988 | A | 12/2021 |
| CN | 113896952 | A | 1/2022 |
| CN | 115490926 | A | 12/2022 |
| GB | 533547 | A | 2/1941 |
| KR | 20180121301 | A | 11/2018 |
| KR | 101972119 | B1 | 8/2019 |
| WO | 2018199375 | A1 | 11/2018 |

*Primary Examiner* — Katarzyna I Kolb

(74) *Attorney, Agent, or Firm* — Ming Jang; OPENPTO US LLC

(57) ABSTRACT

The invention discloses a high-transparency, low-temperature processable cellulose acetate film and its preparation method. The high-transparency cellulose acetate film comprises, by weight percentage, the following raw materials: 75-85 parts of modified cellulose acetate, 12-20 parts of plasticizer, 2-6 parts of transparency agent, where the plasticizer and transparency agent are both composite additives. The preparation process involves uniformly blending all raw materials, followed by uniform mixing and drying, extrusion, granulation, drying, and casting, to obtain a high-transparency cellulose acetate film. The cellulose acetate film prepared by the above method utilizes the synergistic effect of the specific plasticizer and transparency agent, which not only significantly reduces the processing temperature but also results in a film with high light transmittance and low haze. The film exhibits good extensibility and flexibility, excellent antibacterial properties, and the process is simple, time-saving, and efficient, making it suitable for large-scale industrial production.

4 Claims, No Drawings

HIGH-TRANSPARENCY, LOW TEMPERATURE PROCESSABLE CELLULOSE ACETATE FILM AND METHOD FOR PREPARING THE SAME

TECHNICAL FIELD

The present invention belongs to the field of cellulose acetate films, specifically relating to a high-transparency, low-temperature processable cellulose acetate film and a method for preparing the same.

BACKGROUND

Cellulose acetate is a bio-based and biodegradable polymer derived from cellulose. Cellulose is one of the most abundant renewable organic resources on Earth, characterized by excellent toughness, high gloss, superior mechanical strength, high transparency, light stability, and flame resistance. The flexibility and processability of cellulose acetate can be improved by lowering its glass transition temperature. Currently, blending cellulose acetate with plasticizers is the most effective method, and it has been extensively studied as a raw material for manufacturing fibres, films, and composites.

The melting temperature of cellulose acetate is close to its thermal decomposition temperature. Direct melt processing can easily cause oxidative degradation of cellulose acetate, leading to yellowing of the product and poor mechanical properties. Currently, there are two main methods for preparing cellulose acetate: graft modification and blend modification.

Graft modification can fundamentally enhance the flexibility of cellulose acetate and extend its service life. However, it has drawbacks such as high cost and a complex preparation process.

Blend modification is simple and feasible, requiring no introduction of new chemical reactions or additional processes. It is easy to control and can leverage the respective advantages of the components in the blend, making it the most effective means for modifying cellulose acetate films.

Currently, blend modification methods include: 1. solvent method: this involves dissolving cellulose acetate in low-boiling-point organic solvents such as acetone or methyl acetate for processing and molding, however, this method is costly, and the organic solvents used are toxic and flammable. 2 adding small-molecule plasticizers: These weaken the secondary bond interactions between cellulose acetate molecules, enhance the mobility of molecular chains, lower the melting temperature of cellulose acetate to prevent thermal decomposition, and improve the film's flexibility, ductility, and transparency by reducing intermolecular forces between polymer chains. This method is simple to operate and suitable for various processing techniques, making it more widely applicable. The drawback is that small-molecule plasticizers tend to volatilize from the polymer over time, thereby reducing the flexibility of cellulose acetate.

To overcome the shortcomings of small-molecule plasticizers, macromolecular plasticizers have been widely adopted. Polyester plasticizers are a type of high-performance novel plasticizer with advantages such as low volatility, excellent resistance to solvent extraction, oil resistance, solid migration resistance, and good processability.

Natural plasticizers are derived from the natural environment and exhibit excellent biodegradability and environmental friendliness. Among them, glycerol is one of the most commonly used natural plasticizers, offering benefits such as water solubility, polarity, non-volatility, low molecular weight, and a polyhydroxy structure. The addition of glycerol significantly affects the physical behaviour of films by altering the intermolecular forces between the polymer and glycerol molecules, thereby modifying pore structure, gas permeability, and optical properties.

Transparency agents primarily enhance the transparency of polymers. The principle involves adding high-efficiency transparency agents during polymer crystallization to ensure that the crystal size is sufficiently small—smaller than the wavelength of visible light—thereby rendering the polymer completely transparent.

SUMMARY

To address the aforementioned issues in the prior art, the present invention discloses a high-transparency, low temperature processable cellulose acetate film and a method for preparing the same.

To achieve the above objective, the technical solution adopted by the present invention is as follows:

The present invention provides a highly transparent, low-temperature processable cellulose acetate film, comprising the following raw materials in parts by weight: modified cellulose acetate: 75-85 parts; plasticizer: 12-20 parts; transparency agent: 2-6 parts.

In one embodiment, the cellulose acetate in the modified cellulose acetate is selected from cellulose diacetate, cellulose triacetate, cellulose acetate phthalate, or hydroxypropyl methylcellulose.

In one embodiment, the modified cellulose acetate is obtained by modifying cellulose acetate with theanine and glycerol.

The specific method is as follows: dissolving cellulose acetate in N,N-dimethylformamide or acetone; adding glycerol dropwise and react at 120-130° C. for 4-6 hours; under alkaline conditions, reacting at 160-180° C. for 5-10 hours (glycerol polymerization degree: 8-12); adjusting the pH to neutral, then adding theanine dropwise and reacting at 105-135° C. for 4-8 hours; Drying to obtain the modified cellulose acetate.

Preferably, the molar ratio of cellulose acetate:glycerol:theanine is 2:1:1 to 2:2:1.

In one embodiment, the plasticizer is a composite type, comprising a small-molecule plasticizer and a macromolecular plasticizer.

The small-molecule plasticizer is selected from ethyl lactate, trioctyl phosphite, polyethylene glycol, or citrate esters.

The macromolecular plasticizer is a polyester plasticizer with a number-average molecular weight of 800-8,000, selected from neopentyl glycol adipate polyester plasticizer, sorbitol-based polyester plasticizer, acetylated polyglycerol fatty acid ester, or diethylene glycol adipate polyester.

The weight ratio of small-molecule plasticizer to macromolecular plasticizer is 2:1 to 4:1.

In one embodiment, the transparency agent is a composite type.

Inorganic transparency agent is selected from talc, calcium oxide, calcium carbonate, mica, or kaolin. Organic transparency agent is selected from propanol, rosin salts, p-dimethyl dibenzylidene sorbitol, or 1,3:2,4-bis(3,4-dimethylbenzylidene)-D-sorbitol. The weight ratio of inorganic to organic transparency agent is 1:1 to 1:2.

In one embodiment, the preparation method of the high-transparency, low-temperature processable cellulose acetate film comprises: uniformly mixing all raw materials in a high-speed mixer; vacuum heat treatment in an oven (80-110° C., 2-5 h); extrusion, pelletizing, drying, and casting to obtain the final film.

Preferably, the extruder has three zones and a die temperature of 130-170° C., with a screw speed of 30-50 rpm.

Advantages of the present invention compared to the prior art:

By incorporating a composite plasticizer (small-molecule+macromolecular) and a composite transparency agent (inorganic+organic), the invention significantly enhances the transparency of cellulose acetate products and reduces processing temperature through synergistic effects.

The modification of cellulose acetate with glycerol, followed by partial polymerization and further modification with theanine, prevents film discoloration and transparency loss caused by excessive plasticizer addition. Additionally, the hydrogen bonding among glycerol, cellulose acetate, and theanine improves thermal stability and mechanical properties, while theanine imparts antibacterial effects.

The use of environmentally friendly plasticizers minimizes pollution risks even if migration occurs, ensuring eco-safety.

DETAILED DESCRIPTION

The present invention will be further explained below through specific embodiments. These examples are provided to help those skilled in the art better understand the invention, but should not be construed as limiting the scope of the invention in any way. It should be noted that various modifications and improvements may be made by those skilled in the art without departing from the inventive concept of the present invention, and all such modifications and improvements shall fall within the protection scope of the present invention.

Example 1

Preparation of Modified Cellulose Acetate: Cellulose diacetate was dissolved in N,N-dimethylformamide, glycerol was added dropwise, and the reaction was conducted at 120° C. for 6 hours. Then, under alkaline conditions, the reaction continued at 160° C. for 10 hours, with a glycerol polymerization degree of 8. The pH was adjusted to neutral, and theanine was added dropwise, followed by a reaction at 135° C. for 4 hours. Finally, the product was dried to obtain modified cellulose acetate. The molar ratio of cellulose diacetate:glycerol:theanine was 2:1:1.

85 parts of modified cellulose acetate, 16 parts of ethyl lactate, 4 parts of sorbitol-based polyester plasticizer (number-average molecular weight 8000), 2 parts of mica, and 1 part of dimethyl-dibenzylic sorbitol were added to a high-speed mixer and mixed evenly. Heat treatment was carried out at 110° C. for 2 hours. The temperatures for the three sections and die head of the extruder were as follows: section 1 at 130° C., section 2 at 140° C., section 3 at 150° C., and die head at 160° C. The screw speed was set at 30 rpm. The material was then extruded, granulated, dried, and cast to produce a high-transparency, low-temperature processing cellulose acetate film.

Example 2

Preparation of Modified Cellulose Acetate: Phthalic acid cellulose acetate was dissolved in acetone, glycerol was added dropwise, and the reaction was conducted at 130° C. for 4 hours. Then, under alkaline conditions, the reaction continued at 180° C. for 5 hours, with a glycerol polymerization degree of 12. The pH was adjusted to neutral, and theanine was added dropwise, followed by a reaction at 105° C. for 8 hours. Finally, the product was dried to obtain modified cellulose acetate. The molar ratio of phthalic acid cellulose acetate:glycerol:theanine was 2:2:1.

75 parts of modified cellulose acetate, 6 parts of polyethylene glycol, 6 parts of polyhexanediol adipate (number-average molecular weight 800), 1 part of calcium oxide, and 1 part of propanol were mixed evenly. Heat treatment was carried out at 80° C. for 5 hours. The temperatures for the three sections and die head of the extruder were set as follows: section 1 at 140° C., section 2 at 150° C., section 3 at 160° C., and die head at 170° C. The screw speed was set at 50 rpm. The material was then extruded, granulated, dried, and cast to produce a high-transparency, low-temperature processing cellulose acetate film.

Example 3

Preparation of Modified Cellulose Acetate: Triacetate cellulose was dissolved in N,N-dimethylformamide, glycerol was added dropwise, and the reaction was conducted at 125° C. for 4.5 hours. Then, under alkaline conditions, the reaction continued at 175° C. for 6 hours, with a glycerol polymerization degree of 10. The pH was adjusted to neutral, and theanine was added dropwise, followed by a reaction at 120° C. for 5 hours. Finally, the product was dried to obtain modified cellulose acetate. The molar ratio of cellulose triacetate:glycerol:theanine was 2:1.5:1.

80 parts of modified cellulose acetate, 12 parts of citrate ester, 4 parts of acetylated polyglycerol fatty acid ester (number-average molecular weight 1500), 2 parts of calcium carbonate, and 3 parts of dimethyl-dibenzylic sorbitol were mixed evenly. Heat treatment was carried out at 100° C. for 4 hours. The temperatures for the three sections and die head of the extruder were set as follows: section 1 at 135° C., section 2 at 145° C., section 3 at 155° C., and die head at 165° C. The screw speed was set at 40 rpm. The material was then extruded, granulated, dried, and cast to produce a high-transparency, low-temperature processing cellulose acetate film.

Comparative Example 1

85 parts of cellulose diacetate, 16 parts of ethyl lactate, 4 parts of sorbitol-based polyester plasticizer (number-average molecular weight 8000), 2 parts of mica, and 1 part of dimethyl-dibenzylic sorbitol were added to a high-speed mixer and mixed evenly. Heat treatment was carried out at 110° C. for 2 hours. The temperatures for the three sections and die head of the extruder were set as follows: section 1 at 130° C., section 2 at 135° C., section 3 at 140° C., and die head at 160° C. The screw speed was set at 50 rpm. The material was then extruded, granulated, dried, and cast to produce a high-transparency, low-temperature processing cellulose acetate film.

Comparative Example 2

Preparation of Modified Cellulose Acetate: Cellulose diacetate was dissolved in N,N-dimethylformamide, glycerol was added dropwise, and the reaction was conducted at 120° C. for 6 hours. Then, under alkaline conditions, the reaction continued at 160° C. for 10 hours, with a glycerol polymerization degree of 8. The pH was adjusted to neutral, and the product was dried to obtain modified cellulose acetate. The molar ratio of cellulose diacetate:glycerol was 2:1.

85 parts of modified cellulose acetate, 16 parts of ethyl lactate, 4 parts of sorbitol-based polyester plasticizer (number-average molecular weight 8000), 2 parts of mica, and 1 part of dimethyl-dibenzylic sorbitol were added to a high-speed mixer and mixed evenly. Heat treatment was carried out at 110° C. for 2 hours. The temperatures for the three sections and die head of the extruder were set as follows: section 1 at 130° C., section 2 at 140° C., section 3 at 150° C., and die head at 160° C. The screw speed was set at 30 rpm. The material was then extruded, granulated, dried, and cast to produce a high-transparency, low-temperature processing cellulose acetate film.

Comparative Example 3

Preparation of Modified Cellulose Acetate: Cellulose diacetate was dissolved in N,N-dimethylformamide, the pH was adjusted to neutral, and theanine was added dropwise. The reaction was conducted at 135° C. for 4 hours. Finally, the product was dried to obtain modified cellulose acetate. The molar ratio of cellulose diacetate:theanine was 2:1.

85 parts of modified cellulose acetate, 16 parts of ethyl lactate, 4 parts of sorbitol-based polyester plasticizer (number-average molecular weight 8000), 2 parts of mica, and 1 part of dimethyl-dibenzylic sorbitol were added to a high-speed mixer and mixed evenly. Heat treatment was carried out at 110° C. for 2 hours. The temperatures for the three sections and die head of the extruder were set as follows: section 1 at 130° C., section 2 at 140° C., section 3 at 150° C., and die head at 160° C. The screw speed was set at 30 rpm. The material was then extruded, granulated, dried, and cast to produce a high-transparency, low-temperature processing cellulose acetate film.

Comparative Example 4

Preparation of Modified Cellulose Acetate: Cellulose diacetate was dissolved in N,N-dimethylformamide, glycerol was added dropwise, and the reaction was conducted at 120° C. for 6 hours. Then, under alkaline conditions, the reaction continued at 160° C. for 10 hours, with a glycerol polymerization degree of 8. The pH was adjusted to neutral, and theanine was added dropwise. The reaction continued at 135° C. for 4 hours. Finally, the product was dried to obtain modified cellulose acetate. The molar ratio of cellulose diacetate:glycerol:theanine was 2:1:1.

85 parts of modified cellulose acetate, 20 parts of ethyl lactate, 2 parts of mica, and 1 part of dimethyl-dibenzylic sorbitol were added to a high-speed mixer and mixed evenly. Heat treatment was carried out at 110° C. for 2 hours. The temperatures for the three sections and die head of the extruder were set as follows: section 1 at 130° C., section 2 at 140° C., section 3 at 150° C., and die head at 160° C. The screw speed was set at 30 rpm. The material was then extruded, granulated, dried, and cast to produce a high-transparency, low-temperature processing cellulose acetate film.

Comparative Example 5

Preparation of Modified Cellulose Acetate: Cellulose diacetate was dissolved in N,N-dimethylformamide, glycerol was added dropwise, and the reaction was conducted at 120° C. for 6 hours. Then, under alkaline conditions, the reaction continued at 160° C. for 10 hours, with a glycerol polymerization degree of 8. The pH was adjusted to neutral, and theanine was added dropwise. The reaction continued at 135° C. for 4 hours. Finally, the product was dried to obtain modified cellulose acetate. The molar ratio of cellulose diacetate:glycerol:theanine was 2:1:1.

85 parts of modified cellulose acetate, 20 parts of sorbitol-based polyester plasticizer (number-average molecular weight 8000), 2 parts of mica, and 1 part of dimethyl-dibenzylic sorbitol were added to a high-speed mixer and mixed evenly. Heat treatment was carried out at 110° C. for 2 hours. The temperatures for the three sections and die head of the extruder were set as follows: section 1 at 130° C., section 2 at 140° C., section 3 at 150° C., and die head at 160° C. The screw speed was set at 30 rpm. The material was then extruded, granulated, dried, and cast to produce a high-transparency, low-temperature processing cellulose acetate film.

Comparative Example 6

Preparation of Modified Cellulose Acetate: Cellulose diacetate was dissolved in N,N-dimethylformamide, glycerol was added dropwise, and the reaction was conducted at 120° C. for 6 hours. Then, under alkaline conditions, the reaction continued at 160° C. for 10 hours, with a glycerol polymerization degree of 8. The pH was adjusted to neutral, and theanine was added dropwise. The reaction continued at 135° C. for 4 hours. Finally, the product was dried to obtain modified cellulose acetate. The molar ratio of cellulose diacetate:glycerol:theanine was 2:1:1.

85 parts of modified cellulose acetate, 16 parts of ethyl lactate, 4 parts of sorbitol-based polyester plasticizer (number-average molecular weight 8000), and 3 parts of mica were added to a high-speed mixer and mixed evenly. Heat treatment was carried out at 110° C. for 2 hours. The temperatures for the three sections and die head of the extruder were set as follows: section 1 at 130° C., section 2 at 140° C., section 3 at 150° C., and die head at 160° C. The screw speed was set at 30 rpm. The material was then extruded, granulated, dried, and cast to produce a high-transparency, low-temperature processing cellulose acetate film.

Comparative Example 7

Preparation of Modified Cellulose Acetate: Cellulose diacetate was dissolved in N,N-dimethylformamide, glycerol was added dropwise, and the reaction was conducted at 120° C. for 6 hours. Then, under alkaline conditions, the reaction continued at 160° C. for 10 hours, with a glycerol polymerization degree of 8. The pH was adjusted to neutral, and theanine was added dropwise. The reaction continued at 135° C. for 4 hours. Finally, the product was dried to obtain modified cellulose acetate. The molar ratio of cellulose diacetate:glycerol:theanine was 2:1:1.

85 parts of modified cellulose acetate, 16 parts of ethyl lactate, 4 parts of sorbitol-based polyester plasticizer (number-average molecular weight 8000), and 3 parts of dimethyl-dibenzylic sorbitol were added to a high-speed mixer and mixed evenly. Heat treatment was carried out at 110° C. for 2 hours. The temperatures for the three sections and die head of the extruder were set as follows: section 1 at 130° C., section 2 at 140° C., section 3 at 150° C., and die head at 160° C. The screw speed was set at 30 rpm. The material was then extruded, granulated, dried, and cast to produce a high-transparency, low-temperature processing cellulose acetate film.

The properties of the cellulose acetate films produced in the above examples and comparative examples are shown in Table 1.

TABLE 1

| Performance | Testing standard | Example | | | Comparative Example | | | | | | |
| --- | --- | --- | --- | --- | --- | --- | --- | --- | --- | --- | --- |
| | | 1 | 2 | 3 | 1 | 2 | 3 | 4 | 5 | 6 | 7 |
| Transmittance % | GB/T2410-2008 | 95 | 93 | 92 | 85 | 86 | 84 | 90 | 91 | 90 | 91 |
| Haze % | GB/T2410-2008 | 2 | 3 | 3 | 6 | 7 | 5 | 3 | 3 | 4 | 4 |
| Tensile Strength/MPa | GB13022-1991 | 31.5 | 31.6 | 30.5 | 26.5 | 27.5 | 28.8 | 29.8 | 29.6 | 30.8 | 29.7 |
| Heat Resistance/°C. | GB/T19466.4-2016 | 285 | 280 | 282 | 250 | 260 | 265 | 275 | 280 | 270 | 269 |
| Colony Count (per unit) | GB/4789.2-2016 | 48 | 45 | 46 | 152 | 85 | 68 | 51 | 50 | 48 | 49 |

It should be noted that the above are only some of the preferred embodiments of the present invention, and should not be construed as limiting the scope of protection of the present invention. Any modifications and adjustments made by those skilled in the art based on the above content of the present invention that do not deviate from the essence of the invention fall within the scope of protection of the present invention.

The invention claimed is:

1. A cellulose acetate film, characterized in that, by weight, the raw material composition comprises:
   75-85 parts by weight of modified cellulose acetate;
   12-20 parts by weight of plasticizer; and
   2-6 parts by weight of transparency agent;
   wherein the modified cellulose acetate is modified by glycerol and theanine using a method comprising:
   dissolving cellulose acetate in N,N-dimethylformamide or acetone;
   adding glycerol;
   reacting at 120-130° C. for 4-6 hours, then
   reacting under alkaline conditions at 160-180° C. for 5-10 hours, with a glycerol polymerization degree of 8-12;
   adjusting the pH to neutral;
   adding theanine and reacting at 105-135° C. for 4-8 hours; and
   drying to obtain the modified cellulose acetate.

2. The cellulose acetate film of claim 1, characterized in that a molar ratio of cellulose acetate:glycerol:theanine is 2:1:1 to 2:2:1.

3. The cellulose acetate film of claim 1, characterized in that the transparency agent is a composite transparency agent composed of an inorganic transparency agent and an organic transparency agent;
   the inorganic transparency agent comprises one of talc, calcium oxide, calcium carbonate, mica, or kaolin;
   the organic transparency agent comprises one of propylene glycol, rosin salts, dimethyl-diazobenzene sorbitol, or 1,3:2,4-di(3,4-dimethoxybenzyl)-D-sorbitol.

4. The cellulose acetate film of claim 3, characterized in that a mass ratio of inorganic transparency agent to organic transparency agent is 2:1 to 1:2.

* * * * *